United States Patent [19]

Stoudt

[11] Patent Number: 4,865,287

[45] Date of Patent: Sep. 12, 1989

[54] FLAG LOCK

[75] Inventor: Theodore L. Stoudt, Lake Oswego, Oreg.

[73] Assignee: Sign-up Corporation, Portland, Oreg.

[21] Appl. No.: 210,363

[22] Filed: Jun. 23, 1988

[51] Int. Cl.[4] .............................................. F16M 13/00

[52] U.S. Cl. ...................................... 248/513; 116/173

[58] Field of Search ............... 248/513, 512, 539, 511; 116/173; 40/607; 403/240

[56] References Cited

U.S. PATENT DOCUMENTS 1,203,937 11/1916 Surface ................................ 248/513

1,620,820 3/1927 Kane ............................ 116/173 UX 2,256,142 9/1941 Dean ...................................... 248/39

2,669,405 2/1954 Donnelly ............................ 248/513

FOREIGN PATENT DOCUMENTS 560054 9/1923 France ................................ 403/240

1198203 7/1970 United Kingdom ................ 248/513

*Primary Examiner*—J. Franklin Foss

*Attorney, Agent, or Firm*—Grant L. Hubbard

[57] ABSTRACT

A flag holder which comprises a plurality of recepticals for receiving the ends of flag staffs and a clamp having notches for holding the flags in compression against the flag holder.

3 Claims, 2 Drawing Sheets

FLAG LOCK

TECHNICAL FIELD

This invention relates to flags and flag holders on signs of the type which are used as highway warning signs and to attract attention at construction sites, commercial establishments and the like. More particularly, this invention relates to a locking device for flags which are mounted, typically, in the top of standards which support signs.

BACKGROUND OF THE INVENTION

It is often desirable to fly one or more brightly colored flags from the top of the sign to attract attention to the sign. Particularly, these flags are in size from a few inches square or rectangular to as much as two or three feet square or rectangular. In the wind, there is a tendency for the flags to be lifted out of the sockets in which they are held.

In addition, it is now well known to use signs which bend in response to the wind thus tending to place the flags which are mounted on the signs in alignment with the direction of the wind, thus giving an increased tendency for the wind force to pull the flags out of the top of the sign.

One solution to the problem is disclosed in U.S. Pat. No. 4,469,302, dated Sept. 4, 1984, in which the signs are mounted on flag staffs which are then clamped by indentations in a holder on top of the sign. While this is satisfactory in many instances, it has been found that with time and wear and sometimes because of non-fitting flag staffs there is still a tendency to lose some of the flags during high winds.

SUMMARY OF THE INVENTION

The present invention provides a unique clamping arrangement in combination with flags which are in turn in combination with sign stands of the type described in U.S. Pat. No. 4,469,302, which give a more positive clamping action on the flag staffs upon which the flags are carried or mounted.

In a more specific description, the present invention comprises a flag holder which comprises a combination of sockets for receiving the ends of dowels or flag stakes connected together by a web member and a clamp having indentations therein for each of the flags held in compression against the flag staffs by means of fasteners which hold the flag locking clamp toward the web between the sockets for receiving the flags.

DETAILED DESCRIPTION OF THE PREFERRED EMBODIMENT

The present invention comprises a flag lock assembly which includes and is used in combination with a flag holder. The combination of this invention comprises a flag holder generally of the design described in U.S. Pat. No. 4,469,302, which is described here simply for completeness of disclosure.

Figure 4:
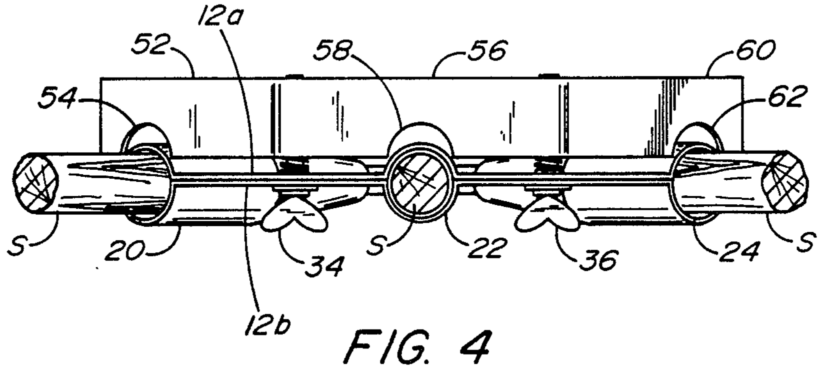
FIG. 4 is a top view of the invention showing the flag stakes in place, the flag stakes being cut away to give a clearer view, the clamp in open position.

The flag holder comprises a web 10 which is formed of two webbed plates **12*a* and 12*b*, best shown in FIG. 4, which are formed to fit together face-to-face and have recesses formed in the surface thereof which coact together, coinciding in space and in dimension, to form staff sockets 20, 22, and 24. The staff sockets are generally cylindrical in the upper portion and in the lower portion are generally conical, or more accurately, frustoconical, in that at the bottom portion the conical portion simply ends with a flat bottom. All this structure is described in U.S. Pat. No. 4,469,302. Indentations as described in the aforesaid patent may or may not be included as desired. The web plates 12*a* and 12*b* also form a receptor 16 for the sign staff which is held in place by a screw 18**, or by some other fastener.

Figure 1:
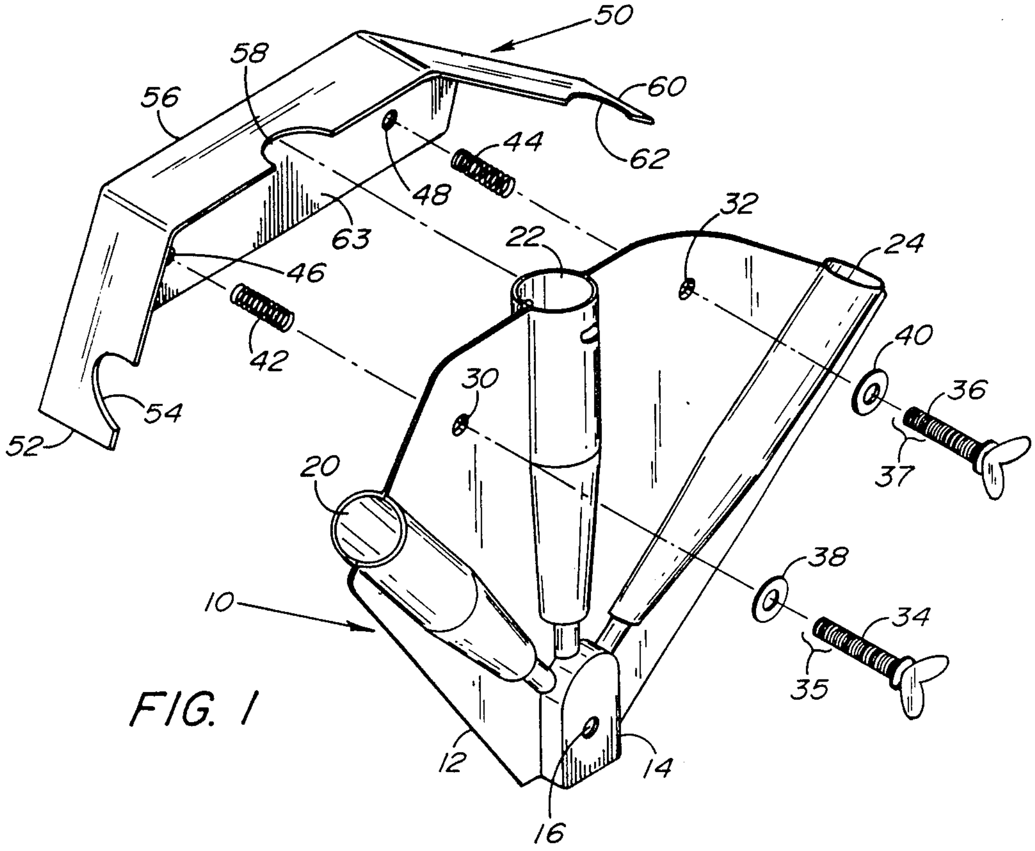
FIG. 1 is a perspective view, in exploded form showing the overall combinational features of the invention and the manner of assembling the same.
Figure 2:
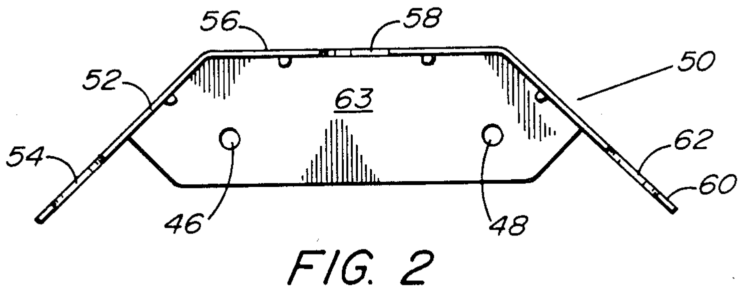
FIG. 2 is a side elevation view of the clamp portion of the present invention.
Figure 3:
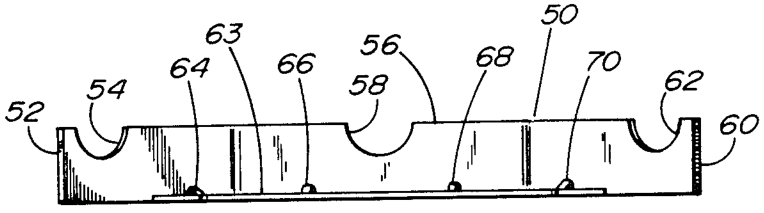
FIG. 3 is a bottom view, with respect to the showing in FIG. 1, of the clamp portion of the invention.
Figure 7:
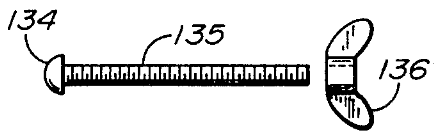
FIG. 7 is an elevational view of the bolt member.

The web plate 10 also has formed near the upper portion thereof at least one, and preferably two or more apertures such as shown at 30 and 32 in FIG. 1. These apertures are sized and adapted to receive one or two or more fasteners, such as screws 34 and 36, which may also have fitted thereupon washers 38 and 40 according to good mechanical assembly practice. The screws 34 and 36 are conveniently in the form of thumb screws of thumb bolts, sometimes called wing bolts or wing screws, which have wings or extensions to permit the user to grasp the end with his fingers. Preferably the threads on the ends of screws are compressed in the areas indicated at 35 and 37 to prevent loosening and loss of the screws. A screw, 134 with compressed threads 135 and a wing nut 136, as shown in FIG. 7, may extend through unthreaded holes and function in basically the same way.

In use, the distal end of the wing bolts 34 and 36 are threaded and are threadably received into threaded apertures 46 and 48 in the clamping member 50 and compresses the clamping member 50 toward the flag staff holder which has just been described.

The clamping member 50, in this particular embodiment, comprises a bent strap comprising a first portion 52 which has formed therein a semi-circular opening 54, a second portion 56 having formed therein a semi-circular opening 58 and a third portion 60 having formed therein a semi-circular opening 62. The metal strap is connected by welding, or during fabrication, or in some other way to a plate 62, through which the apertures 46 and 48 are drilled. Weldments 64, 66, 68 and 70 are shown as examples of the kinds of attachments which may be used, although no particular form of attachment or fabrication is necessary and the method of fabrication is not critical. For example, the plate 62 may be formed by standing as an integral part of the strap and then simply bent and locked into place by rivets, bolts, weldments or otherwise.

Making reference now to FIG. 4, the entire assembly is shown, with the clamp open. It will be noted that the semi-circular openings 54, 58 and 62 are loose, thus permitting the flag staffs end to be inserted into the receptacles.

Figure 5:
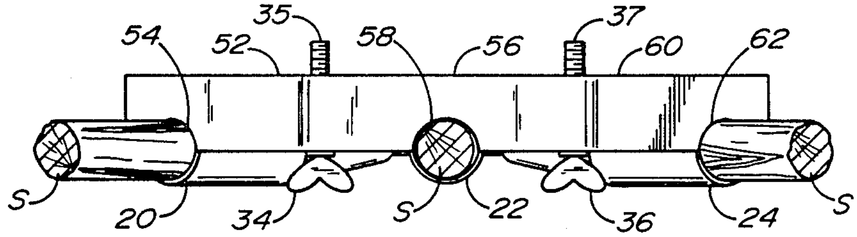
FIG. 5 is a top view of the clamp assembly of this invention comparable to that shown in FIG. 4 but with the clamp shown in closed position.

Referring now to FIG. 5, the screws 34 and 36 have been tightened up, drawing the clamping member toward the web and causing the semi-circular openings 54, 58, and 62 to engage and tightly secure the staffs which are received in the receptacles 20, 22 and 24.

Figure 6:
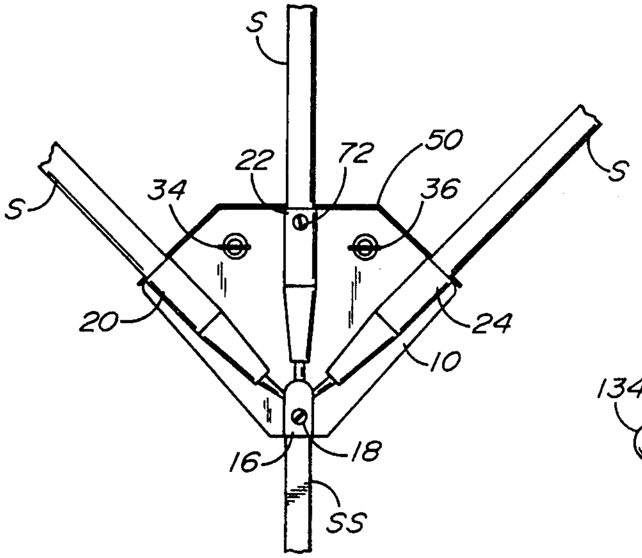
FIG. 6 is a side elevational view of the clamp assembly of the present invention clamping flag staffs in place, the entire combination being shown.

Referring now the FIG. 6, the entire assembly is shown in the vertical upright position in which is would normally be used, supported by the sign staff designated S, the flag staffs in the receptacles 20, 22, and 24 being clamped in place by the clamping element 50, the clamping action being secured by means of the wing screws 34 and 36.

It is also possible to provide apertures and screws, such as screw 72 if permanent securement of the staff into the receptacle is desired. Normally this is not so. However, in some instances, it is desirable to secure the center flag staff into the holder where it is stored with the holder in an elongate box or other container. It is not usually desirable to secure the side staffs in the receptacles because they extend outward and make storage inconvenient and occupy unnecessary space during storage and handling. In addition, this subjects the staffs holding the flags to considerable force and to possible breakage.

While considerable variation is permitted within the scope of the invention, and specific methods of manufacture, fabrication, fastening, etc., may be adapted in an infinite variety of ways to accomplish the same purpose, there are some very significant advantages to the invention which accomplish results not previously accomplished in this art.

For example, while any number of flag staffs may be secured, there is little benefit, in most instances for securing more than three, and up to five flag staffs. There are some advantages in limiting the number of flag staffs secured in the holder to three and to using two bolts or screws, such as wing bolts 34 and 36, to fasten the clamp. This arrangement, a center flag and two side flags, with a screw or other fastener between the center flag and one of the side flags, and, on the other side, between the center flag and the other of the side flags, gives a certain and reliable clamping action against all of the flag staffs.

Another advantage of the present invention is the provision of the springs 42 and 44 which automatically move the clamping element 50 away from the flag staffs when the screws are released and permits quick and convenient release of the flag staffs from the receptors.

The invention is typically made of steel which is stamped or otherwise formed and is fastened together with weldments, rivets, or some other conventional fastening means. The invention can, however, be formed of aluminum or any other metal, or any reasonable rigid material such as the conventional structural plastics, e.g. nylon and comparable materials.

Thus, within the principle of the invention considerable variation is permitted without departing from the spirit and scope thereof.

INDUSTRIAL APPLICATION

This invention finds application in warning signs and in advertising signs generally.

What is claimed is:

1. A signal device comprising, in combination:

a sign staff for supporting a sign;

at least one flag staff holder proximate an end of the sign staff for supporting a plurality of flags, said flag staff holder comprising a plurality of receptacles for receiving an end of a plurality of elongate generally rigid flag staff holders and rigid metal web areas between said receptacles;

clamp means comprising a rigid clamping bar having formed therein a plurality of notches for receiving the flag staff therein and a web member generally perpendicular to the clamping bar; and tightening means extending through the web member and at least one of the web areas for forcing said rigid clamp against the flag staff and securing the rigid clamp adjacent the receptacle for the flag staff;

the staff holder and clamp means being so constructed and configured that the tightening means, when tightened, forces the rigid clamp against one side of the flag staff and forces the other side of the flag staff against the receptacle, thereby locking the flag staff in the receptacle.

2. The signal device of claim 1 wherein the rigid clamp is an elongate bar bent to clamp a plurality of flags in a diverging pattern.

3. The signal device of claim 2 wherein the tightening means comprises at least one bolt and nut combination.

* * * * *